US007565350B2

(12) United States Patent
Fetterly et al.

(10) Patent No.: US 7,565,350 B2
(45) Date of Patent: Jul. 21, 2009

(54) IDENTIFYING A WEB PAGE AS BELONGING TO A BLOG

(75) Inventors: Dennis Craig Fetterly, Belmont, CA (US); Steve Shaw-Tang Chien, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 198 days.

(21) Appl. No.: 11/471,403

(22) Filed: Jun. 19, 2006

(65) Prior Publication Data

US 2007/0294252 A1 Dec. 20, 2007

(51) Int. Cl.
*G06F 17/30* (2006.01)

(52) U.S. Cl. .................. 707/7; 707/3; 707/5; 707/8

(58) Field of Classification Search .................. None
See application file for complete search history.

(56) References Cited

U.S. PATENT DOCUMENTS

| 5,960,429 | A | 9/1999 | Peercy et al. ................... 707/5 |
| 6,606,659 | B1* | 8/2003 | Hegli et al. ................ 709/225 |
| 6,976,018 | B2 | 12/2005 | Teng et al. ...................... 707/3 |
| 2002/0194161 | A1 | 12/2002 | McNamee et al. ............. 707/2 |
| 2003/0221163 | A1 | 11/2003 | Glover et al. ............ 715/501.1 |
| 2003/0225763 | A1* | 12/2003 | Guilak et al. ................... 707/7 |
| 2004/0193591 | A1 | 9/2004 | Winter ........................... 707/3 |
| 2004/0267725 | A1 | 12/2004 | Harik ............................. 707/3 |
| 2005/0033745 | A1* | 2/2005 | Wiener et al. ................. 707/10 |
| 2005/0038717 | A1* | 2/2005 | McQueen et al. ............. 705/27 |
| 2005/0076023 | A1 | 4/2005 | Wu et al. ........................ 707/3 |
| 2005/0080779 | A1 | 4/2005 | Peltonen et al. ................ 707/3 |
| 2005/0193010 | A1 | 9/2005 | DeShan et al. ........... 707/104.1 |
| 2006/0004850 | A1 | 1/2006 | Chowdhury ................ 707/103 |
| 2006/0041530 | A1 | 2/2006 | Milic-Frayling et al. ....... 707/2 |
| 2006/0200483 | A1* | 9/2006 | Gorzela et al. ............. 707/102 |
| 2006/0259462 | A1* | 11/2006 | Timmons ....................... 707/3 |
| 2006/0287989 | A1* | 12/2006 | Glance .......................... 707/3 |
| 2007/0239701 | A1* | 10/2007 | Blackman et al. ............. 707/5 |

OTHER PUBLICATIONS

Ader, E. et al., "Implicit Structure and the Dynamics of Blogspace", *Second Annual Workshop on the Weblogging Ecosystem: Aggregation, Analysis and Dynamics*, 2005, 8 pages.
Alerigi, A., "Brazil Internet Craze Angers English Speakers", Jul. 14, 2004, Reuters News.
Nielsen BuzzMetrics' Blog Pulse, http://www.blogpulse.com, Jan. 2006.

(Continued)

*Primary Examiner*—Khanh B Pham
*Assistant Examiner*—Andalib F Lodhi
(74) *Attorney, Agent, or Firm*—Woodcock Washburn LLP

(57) ABSTRACT

A machine learning classifier is used to determine whether a web page belongs to a blog, based on a number of characteristics of web pages (e.g., presence of words such as "permalink", or being hosted on a known blogging site). The classifier may be initially trained using human-judged examples. After classifying web pages as being blog pages, the blog pages may be further identified or categorized as top level blogs based on their URLs, for example.

16 Claims, 4 Drawing Sheets

OTHER PUBLICATIONS http://www.blogcensus.net, Jan. 2006.

Brin, S. et al., "The Anatomy of a Large-Scale Hypertextual Search Engine", *Computer Networks and ISDN Systems*, 1998, 30(1-7), 107-117.

Broder, A. et al., "Graph Structure in the Web", *Proceedings of the 9th International World Wide Web Conference (WWW9)Computer Networks*, 2000, 33, 309-320.

Fetterly, D. et al., "Damn, Spam, and Statistics: Using Statistical Analysis to Locate Spam Web Pages", *7th International Workshop on the Web and Database*, Jun. 2004, 6 pages.

Fetterly, D. et al., "A Large-Scale Study of the Evolution of Web Pages", *Proceedings of the 12th International World Wide Web Conference (WWW12)*, 2003, 669-678.

Gibson, D. et al., "Discovering Large Dense Subgraphs in Massive Graphs", *Proceedings of the 31st International Conference on Very Large Data Bases*, Aug. 2005, 721-732.

Gruhl, D. et al., "Information Diffusion Through Blogspace", *Proceedings of the 13th International World Wide Web Conference*, 2004, 491-501.

Gupta, S. et al., "Genre Classification of Websites Using Search Engine Snippets", *SIGIR*, 2005, http://www.cs.columbia.edu/techreports/cucs-004-05.pdf, 4 pages.

Gyöngyi, Z. et al., Web Spam Taxonomy, *Proceedings of the First International Workshop on Adversarial Information Retrieval on the WEB (AIRWeb)*, 2005, 1-9.

Kolari, P. et al., "SVMs for the Blogosphere: Blog Identification and Splog Detection", 2006, http://ebiquity.umbc.edu/_file_directory_/papers/213.pdf, 8 pages.

Kumar, R. et al., "On the Bursty Evolution of Blogspace", *Proceedings of the 12th International World Wide Web Conference (WWW12)*, 2003, 568-576.

Kumar, R. et al., "Structure and Evolution of Blogspace", *Communications of the ACM*, 2004, 47(12), 35-39.

Online Computer Library Center, http://www.oclc.org/research/projects/archive/wcp/stats/itnl.htm, Jan. 2006.

Anderson, O.T. et al., "Global Namespace for Files" *Grid Computing*, 2004, 43(4), 19 pages.

Ghemawat, S. et al., "The Google File System", *SOSP*, Oct. 19-22, 2003, 29-43.

Price, S., "Weblog Recommender Service using Machine Learning and Semantic Web Technologies", 2003, http://ilrt.org/discovery/2003/05/student-projects/weblog-recommender-background.pdf, 2 pages.

* cited by examiner

IDENTIFYING A WEB PAGE AS BELONGING TO A BLOG

BACKGROUND

Blogging has grown rapidly on the internet over the last few years. Weblogs, referred to as blogs, span a wide range, from personal journals read by a few people, to niche sites for small communities, to widely popular blogs frequented by millions of visitors, for example. Collectively, these blogs form a distinct subset of the internet known as blogspace, which is increasingly valuable as a source of information for everyday users.

Search engines are increasingly implementing features that restrict the results for queries to be from blog pages. The website www.blogcensus.net gives information on an effort to index blogs, though this was apparently discontinued in late 2003. At that time, the site stated that it had indexed 2.8 million blogs. Currently, Technorati claims to be tracking 43.2 million blog sites. It is currently difficult for search engines to identify blog pages, regardless of the source of the content in a blog page.

SUMMARY

A machine learning classifier is trained with features that are used to classify web pages as either blog or non-blog. Categories of features include (1) where the page is hosted, e.g., a page is hosted in a known blog hosting domain, (2) the non-HTML markup words and phrases contained in the web page; (3) the targets of outgoing links in the web page; (4) the particular strings and/or substrings in a uniform resource locator (URL) for a web page; and (5) if the web page contains an ATOM feed or an RSS feed. Some or all of the features in some or all of the categories may be used by the classifier, either in an initial classification, or in a subsequent classification in order to refine the initial classification.

After classifying web pages as being blog pages, the blog pages may be further identified or categorized as top level blogs based on their URLs, for example. A top level blog is defined to be the main blog page that a set of pages classified as blog pages belong to.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A machine learning classifier is used to determine whether a web page belongs to a blog, based on a number of characteristics of web pages (e.g., presence of words such as "permalink", or being hosted on a known blogging site). The classifier may be initially trained using human-judged examples. After classifying web pages as being blog pages, the blog pages may be further identified or categorized as top level blogs based on their URLs, for example.

Figure 1:
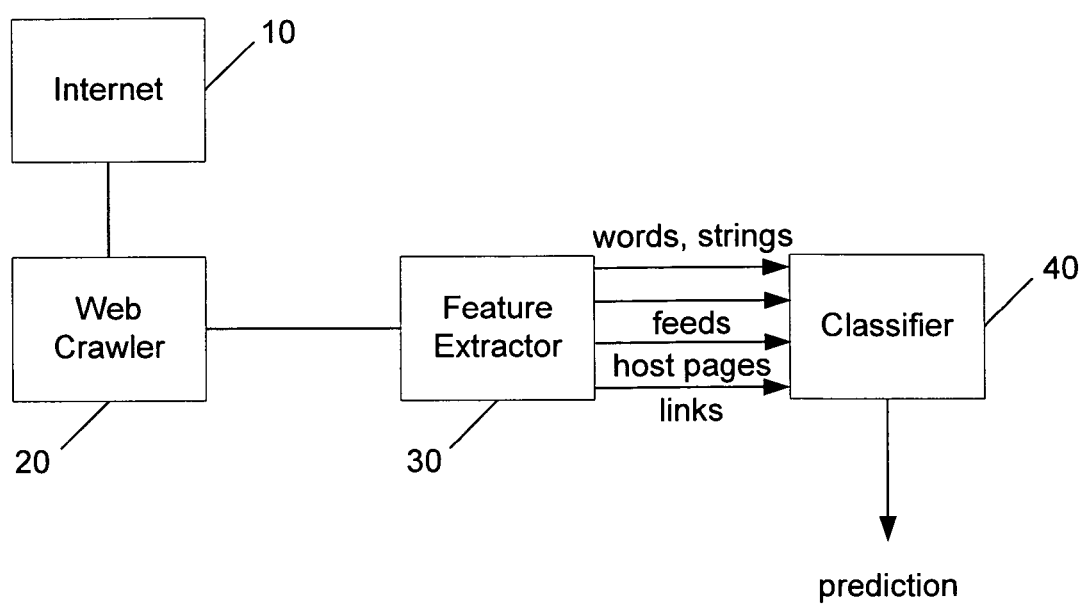
FIG. 1 is a block diagram of an example classification system.

FIG. 1 is a block diagram of an example classification system that comprises a web crawler 20, a feature extractor 30, and a classifier 40. The web crawler 20, feature extractor 30, and classifier 40 may reside on the same computing device or be spread over multiple computing devices. An example computing environment is describe further herein with respect to FIG. 5.

A web crawler 20 crawls a corpus of web pages, such as the internet 10, and provides the web pages to a feature extractor 30 which then extracts one or more features from a web page. The features may include words and/or links, for example, and are provided to a machine learning classifier 40. The feature extractor 30 can desirably perform extraction on any web page, such as those in HTML or RSS, for example. For example, the feature extractor 30 may take the URL of the web page, along with the contents of the web page, parse the HTML, and use the list of non-markup words and links as input. As output, the feature extractor may write the URL as well as the observed value for each feature. Example values may include a Boolean value or a count.

The classifier 40 analyzes the features and generates an indication or prediction as to whether the web page that provided the features is a blog page or not. The indication or prediction may a "yes" or "no", for example, indicating that the web page is a blog page or not. Alternately, the prediction may be a number or percentage, such as "95%", indicating the likelihood or probability that the web page is a blog page, for example.

Categories of features have been identified that are useful for determining the classification of a web page. In addition to those described herein, it is contemplated that additional features and categories of features may be used in the classification of a web page.

One category of features is where the page is hosted, e.g., if a page is hosted in a known blog hosting DNS domain, such as MSN Spaces (e.g., spaces.msn.com), Blogspot (e.g., blogspot.com), Yahoo 360, LiveJournal, Typepad, Xanga, MySpace, Multiply, or Wunderblogs, for example. If the web page is hosted on one of these blog hosting sites, for example, it is likely a blog page. The blog hosting sites listed here are examples, and the classifier can base its prediction on these and/or other sites, alone or in combination with other features.

Another category of features is the non-HTML markup words and phrases contained in the web page. If the web page contains the word "blogroll" or "metaphilter", for example, it is likely a blog page. Moreover, the number of occurrences of certain terms or words in a web page may indicate that it is a blog page. Terms or words that may be counted include "blog", "powered by", "permalink", "trackback", "comment", "comments", "blogad", and "posted at", for example. Desirably, the classifier and its prediction are language independent. Accordingly, the non-English equivalents of these words may also be counted. Desirably, the feature extractor does the counting (e.g., as it parses a web page). The number of occurrences of these words in a web page may be used by the classifier in generating its prediction.

The targets of outgoing links in the web page may also be considered as a category of features. Links in a web page that likely indicate a blog page include links to http://www.movabletype.com/, http://wordpress.org/, and http://www.blogger.com/, for example.

Furthermore, the particular strings and/or substrings in a URL for a web page may be considered as a category of features. For example, if the string "blog" occurs in the URL for the web page, that web page may likely be considered to be a blog page.

Moreover, if the web page contains an ATOM feed or an RSS feed, it is likely a blog page. RSS is a commonly used protocol to share the contents of blogs, and RSS feeds are sources of RSS information about websites. RSS is being supplemented by a newer, more complex protocol called ATOM.

Thus, for example, the URL, words, and/or links contained in a web page are extracted by the extractor 30 and processed to create the input used by the classifier 40. A class constructor may store the URL of the web page, which may be used in feature evaluation. Arrays may contain the non-HTML markup words in a web page and the links in a web page. These arrays may then be used in feature evaluation.

One or more of the features or categories of features may be used in the classification. For example, only one category of features may be used by the classifier, or a combination of some of the features may be used. More than one feature may be used, or all features may be used. Time-accuracy tradeoffs should be considered when determining which features to use in a classification. For example, parsing HTML documents to find the content based-features is relatively expensive in terms of processing and time, while link-based information does not require parsing of documents.

The machine learning classifier 40 desirably has a machine learning algorithm and is trained with the features. Any machine learning algorithm may be used, and the learning classifier weights the features accordingly. For example, where the web page is hosted may be weighted more heavily than the targets of outgoing links in the page, which in turn may be weighted more heavily than the substrings in the URL for the web page. An example classifier that may be used is a C4.5 decision tree classifier, a well known freely available classifier.

Figure 2:
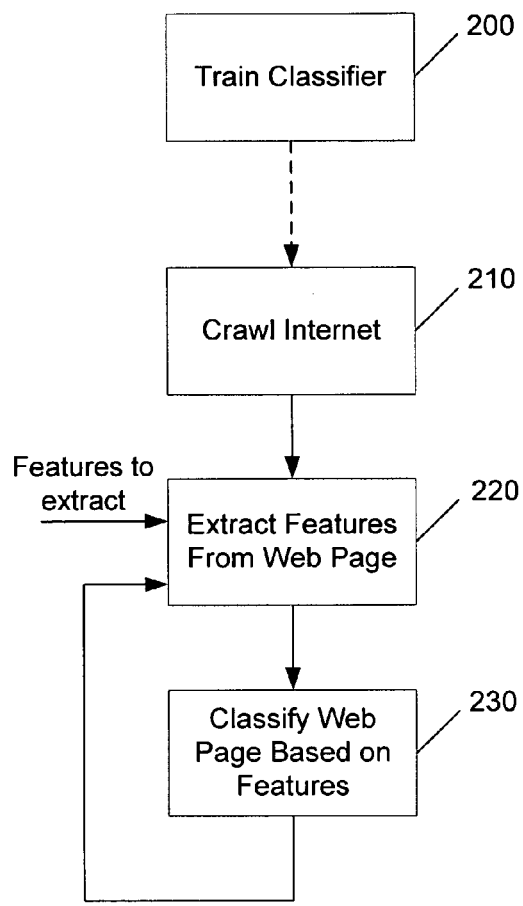
FIG. 2 is a flow diagram of an example classification method.

FIG. 2 is a flow diagram of an example classification method. At step 200, the machine learning classifier is trained. Training data may be produced by manually judging a random sample of web pages, for example. After the training data is provided, and the classifier is formulated based on this data (e.g., by using the C4.5 algorithm), the classifier may then be used for prediction and/or identification of web pages as blog pages.

At some point after training, the internet is crawled by a web crawler, at step 210, and features are extracted from a web page that result from the crawling, at step 220. The features that are extracted by a feature extractor may be based on the features that will subsequently be used by the classifier. In this manner, time or expense are not used to extract features that will not be used by the classifier. The feature extractor desirably can be programmed to select only those features that will be used by the classifier.

The extracted features are provided to the classifier, and the classifier classifies the web page based on the received features, at step 230. The classifier provides an indication, prediction, or probability as to whether the web page is a blog page or not. Steps 220-230 may repeat for additional web pages that were crawled.

More than one classification process may occur on a web page. For example, an initial classification process may run, and then if the probability that the web page is a blog is within a certain range, e.g., 80-95 percent, based on the classifier, one or more additional classification processes may be run, using additional extracted features.

Figure 3:
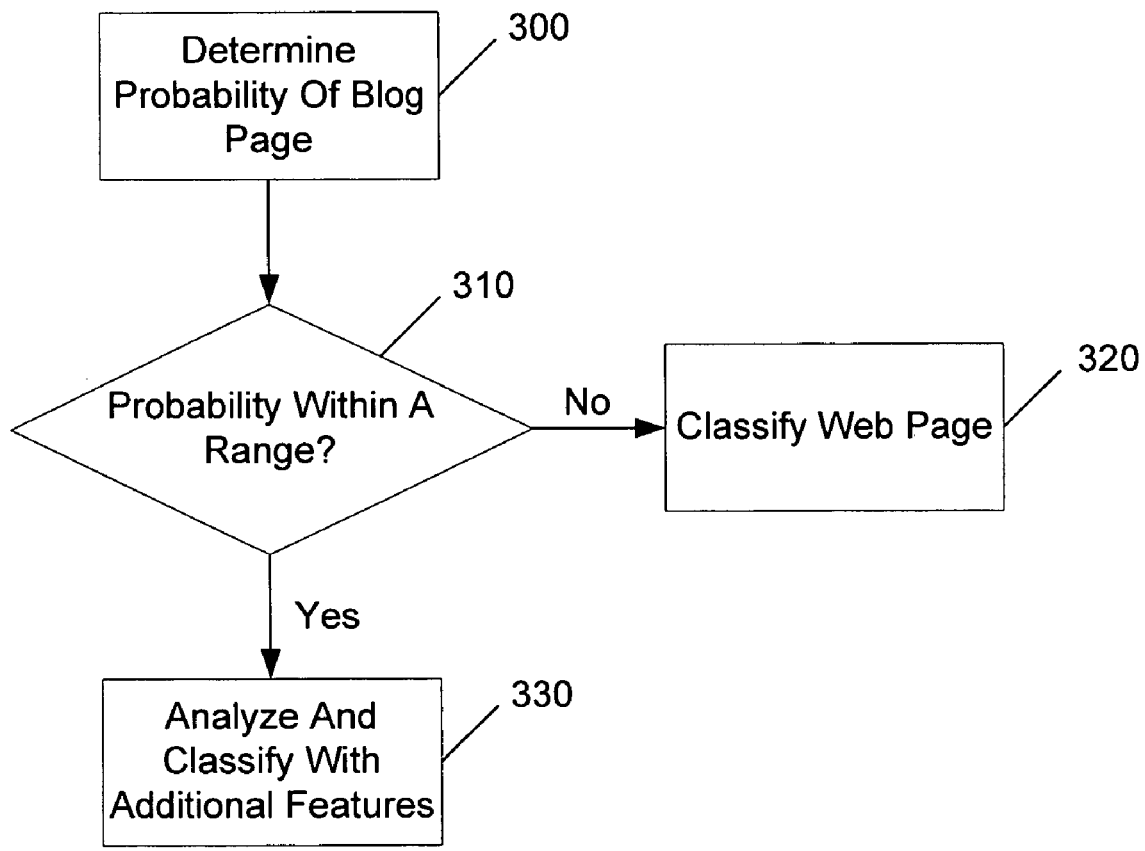
FIG. 3 is a flow diagram of another example classification method.

FIG. 3 is a flow diagram of another example classification method. A probability that a web page is a blog page is determined at step 300, using the techniques described above with respect to FIG. 2, for example. Probability may be given in percentage, for example. Thus, a probability of 40 percent would indicate that there is a 40 percent likelihood that the web page is a blog page. At step 310, it is determined if the probability is within a predetermined range, for example, 80 percent to 95 percent. The range may correspond to a set of probabilities in which a clear determination of whether a web page is a blog page cannot be readily made with desired confidence.

If the probability is within the predetermined range, then further analysis may be performed to refine the probability. Additional features of the web page are analyzed and the web page is classified, at step 330. These features may be features that were not part of the initial feature extraction group (e.g., step 220) or may be features that had been extracted already but were not yet used by the classifier (e.g., step 230) for processing efficiency purposes, for example. The additional features to use in the classification may be programmed into the classifier and/or extractor. Desirably, if the additional features have not yet been extracted, the feature extractor extracts them. The classifier uses these additional features to re-classify the web page and provide an indication, prediction, or probability as to whether the web page is a blog page or not. Additional analysis and classification may be performed with yet additional features based on the results of step 330, if desired.

If, on the other hand, the probability of the web page being a blog page is outside of the predetermined range at step 310, then the web page classification is provided based on the initial set of features that were extracted and analyzed. In this case, the likelihood of the web page being properly classified as a blog page or not is desirably strong.

Figure 4:
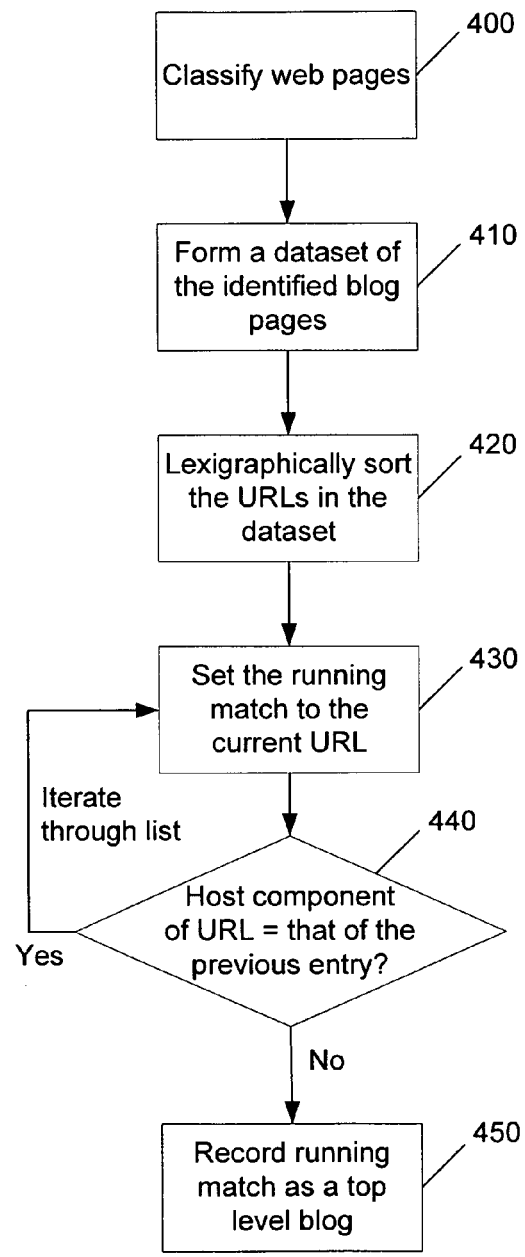
FIG. 4 is a flow diagram of another example classification method.

FIG. 4 is a flow diagram of another example classification method that determines which blog pages comprise a top level blog. A top level blog is defined to be the main blog page that a set of pages classified as blog pages belong to. At step 400, a plurality of web pages are classified, using the techniques described above with respect to FIGS. 2 and/or 3, for example. The web pages that are classified as blog pages form a dataset, at step 410. The URLs in the dataset are lexigraphically sorted, at step 420.

Next, the URL list is iterated over. For example, the running match is set to the current URL, at step 430. As long at the host component of the URL matches that of the previous entry, as determined at step 440, the greatest common prefix of the current URL and the running match is retained. When the host component no longer matches, the running match is recorded as a top level blog at step 450, and processing continues on the additional URLs in the list. This generally identifies most top level blogs, though special cases may be added, e.g., to handle large blog hosting providers that use URL formats that may not be identified as discrete blogs (such as LiveJournal).

The features used to predict and classify a web page as being a blog page or not are page specific, and they are not based on the internet as a whole. Therefore, the prediction value of a page desirably will not change over time (e.g., various web crawls) if the content of the page does not change.

Exemplary Computing Arrangement

Figure 5:
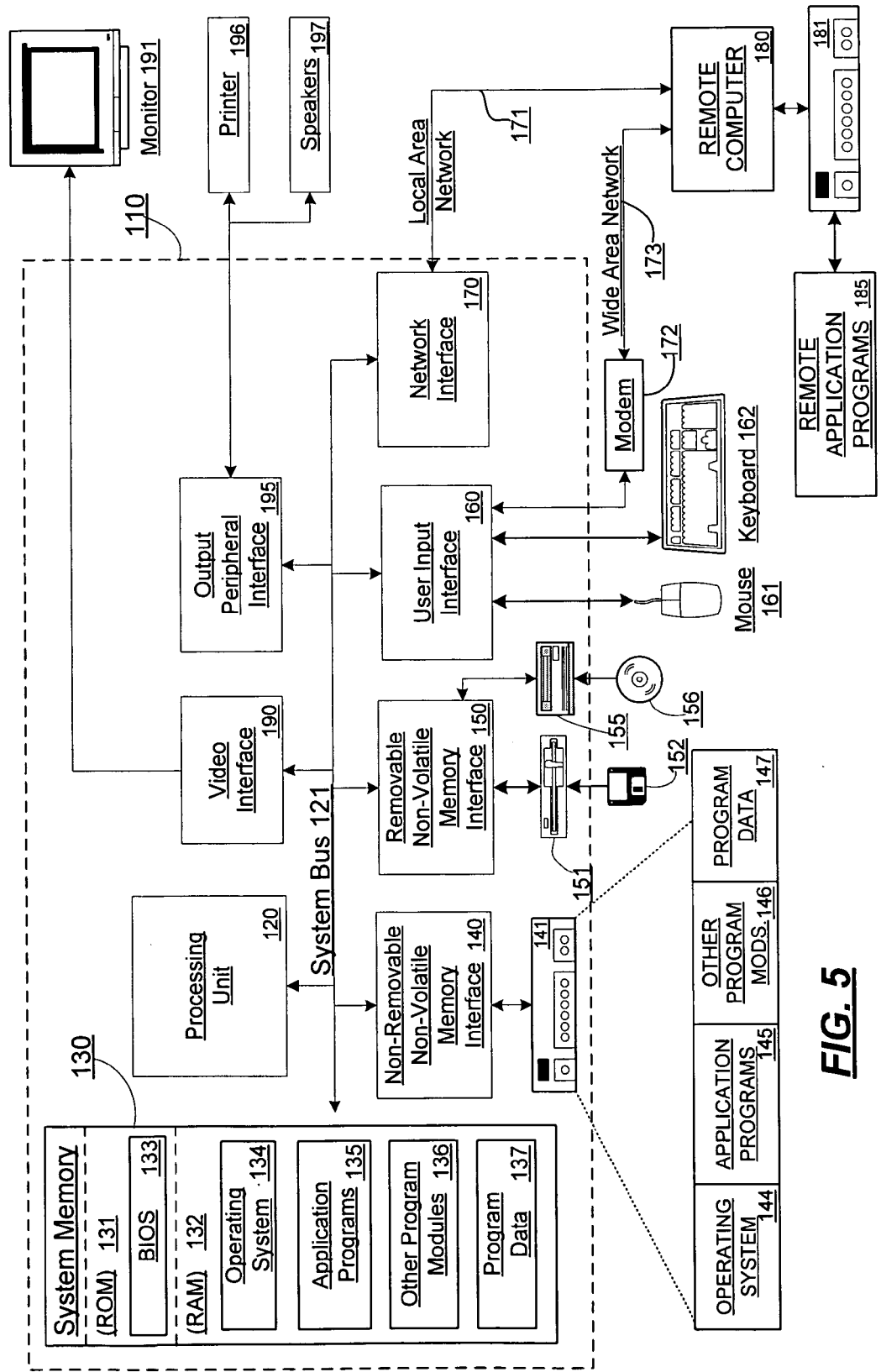
FIG. 5 is a block diagram of an example computing environment in which example embodiments and aspects may be implemented.

FIG. 5 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5, provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad.

Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A data storage medium for web page classification system, comprising:
    a web crawler for crawling a corpus of web pages;
    a feature extractor for extracting at least one of the following features from a web page received from the web crawler: a first uniform resource locator (URL) corresponding to the hosting site of the web page, a second URL contained inside the web page that is indicative of a hyperlink to a blog site, at least one substring that is a part of the first URL, and whether the web page contains an ATOM or RSS feed, the feature extractor further configured for extracting the contents of the web page and generating therefrom a set of observed values, wherein each observed value is associated with a feature in the web page that provides an indication that the web page is a blog page, the set of observed values including a first observed value that is generated based on the number of occurrences in the web page of a non-markup word indicative of a blog; and
    a machine learning classifier communicatively coupled to the feature extractor for evaluating the extracted features and generating a prediction indicating the probability that the web page is a blog page, the classifier containing an algorithm that is trained to apply i) a heavier classifier weight to the first URL corresponding to the hosting site of the web page than to the second URL contained inside the web page, and ii) a heavier classifier weight to the second URL than the substring that is a part of the first URL.

2. The data storage medium of claim 1, wherein the extracted feature further comprises at least one phrase contained in the web page in combination with at least one of the other extracted features.

3. The data storage medium of claim 1, wherein each of the set of observed values generated by the feature extractor is a Boolean value.

4. The data storage medium of claim 1, wherein the classifier is configured to be initially trained using human-judged examples.

5. The data storage medium of claim 1, wherein the non-markup word is at least one of the following words: i) "blog", ii) "permalink", iii) "comment", iv) "posted", and v) "track back".

6. The data storage medium of claim 1, wherein the classifier is configured to be language independent, and wherein non-English equivalents of the non-markup word are counted for generating the first observed value.

7. The data storage medium of claim 1, wherein the feature extractor is configured to generate the set of observed values from a set of features that art selected based on the configuration of the classifier.

8. The data storage medium of claim 1, wherein the set of observed values further includes a second observed value that is generated based on the number of occurrences in the web page of a phrase indicative of a blog.

9. A web page classification method, comprising:
    crawling, via a processor, a corpus of web pages and providing the web page to a feature extractor;
    extracting at least one feature, from the received web page using a feature extractor, wherein the at least one feature comprises one or more of the following: a count of the number of occurrences of a blog-related word in the web page, a first uniform resource locator (URL) corresponding to the host of the web page, a second URL contained inside the web page that is indicative of a hyperlink to a blog site, at least one substring that is a part of the first URL, and whether the web page contains an ATOM feed or an RSS feed, the feature extractor further configured for extracting the contents of the web page and generating therefrom a set of observed values, wherein each observed value is associated with a feature in the web rage that provides an indication that the web page is a blog page, the set of observed values including a first observed value that is generated based on the number of occurrences in the web page of a non-markup word indicative of a blog; and
    classifying the web page as being a blog page or not based on an evaluation of the at least one extracted feature, the evaluation comprising application of i) a heavier classifier weight to the first URL than to the second URL contained inside the web page, and ii) a heavier classifier weight to the second URL than the substring that is a part of the first URL.

10. The method of claim 9, further comprising extracting at least one wherein the at least one feature further comprises combining a phrase contained in the web page with at least one of the other extracted features.

11. The method of claim 9, wherein classifying the web page comprises providing an indication, prediction, or probability that the web page is a blog page or not.

12. The method of claim 9, further comprising:
forming a set of web pages that are classified as being a blog page; and
identifying a top level blog in the set of web pages.

13. A web page classification method, comprising:
classifying, via a processor, a plurality of web pages, each as being a blog page or not based on at least one extracted feature that comprises a count of the number of occurrences of a blog-related word in the web page, a first uniform resource locator (URL) corresponding to the host of the web page, a second URL contained inside the web page that is indicative of a hyperlink to a blog site, at least one substring that is a part of the first URL, and whether the web page contains an ATOM feed or an RSS feed, the feature extractor further configured for extracting the contents of the web page and generating therefrom a set of observed values, wherein each observed value is associated with a feature in the web page that provides an indication that the web page is a blog page, the set of observed values including a first observed value that is generated based on the number of occurrences in the web page of a non-markup word indicative of a blog, the classifying comprising application of i) a heavier classifier weight to the first URL than to the second URL contained inside the web page, and ii) a heavier classifier weight to the second URL than the substring that is a part of the first URL;
forming a set of web pages that are classified as being a blog page; and
identifying a top level blog in the set of web pages.

14. The method of claim 13, further comprising lexigraphically sorting the uniform resource locators (URLs) of each of the web pages in the set.

15. The method of claim 14, wherein identifying the top level blog comprises iterating through the lexigraphically sorted URLs to determine a common prefix of the web pages.

16. The method of claim 13, wherein the at least one extracted feature further comprises at least one weid-ef phrase contained in the web page in combination with any of the other extracted features.

* * * * *